May 18, 1948.     H. KLEMPERER     2,441,822
CONDENSER CHARGING AND DISCHARGING SYSTEM
Filed Nov. 6, 1945
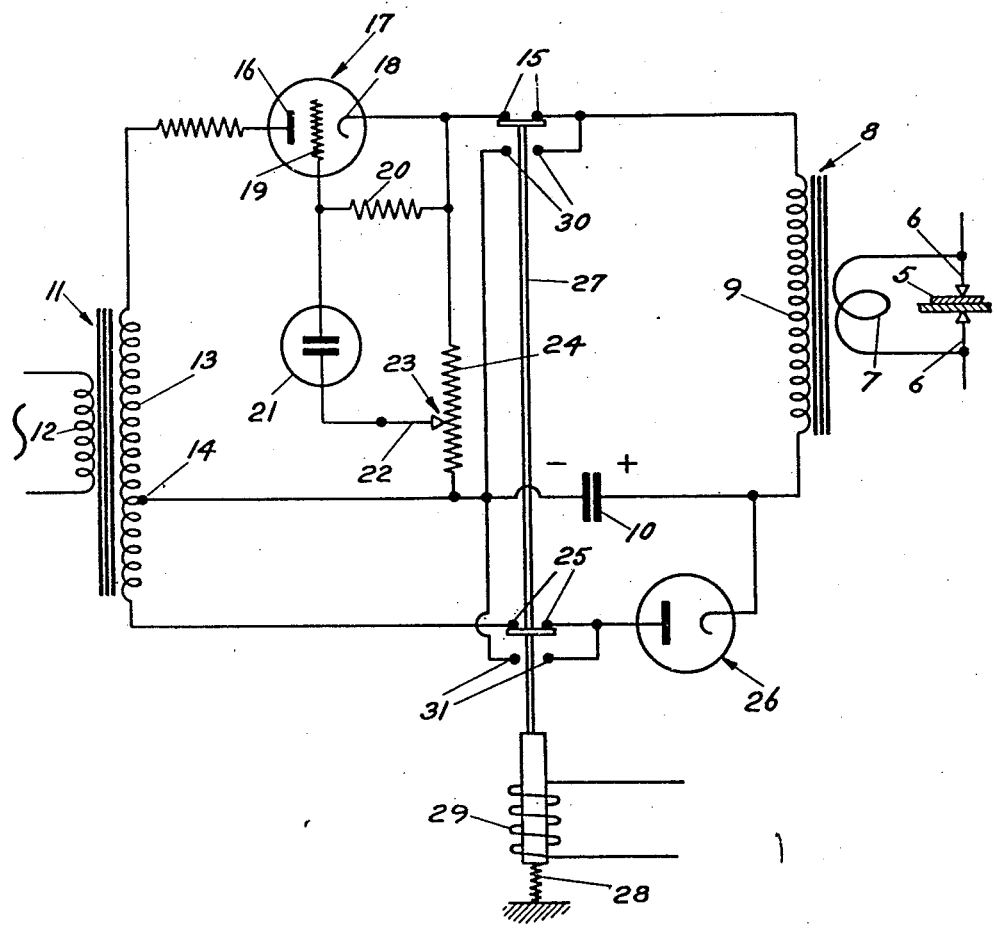
INVENTOR
HANS KLEMPERER
BY Elmer J. Gorn
ATTY.

Patented May 18, 1948

2,441,822

UNITED STATES PATENT OFFICE 2,441,822

CONDENSER CHARGING AND DISCHARGING SYSTEM

Hans Klemperer, Belmont, Mass., assignor to Raytheon Manufacturing Company, Newton, Mass., a corporation of Delaware Application November 6, 1945, Serial No. 627,054

11 Claims. (Cl. 320—1)

This invention relates to systems for charging and discharging electrical condensers suitable, for example, in welding systems of the type in which the electrical energy is stored in a condenser and then discharged through a welding transformer to deliver welding current to a resistance welding load.

Condenser systems of the type to which the invention relates involve a number of gaseous discharge tubes for effecting various functions. For example, it is usually desired to charge the condenser from an alternating current supply line, and for the purpose of supplying a rectified charging current to the condenser, one or more rectifier tubes, usually of the gaseous discharge type and capable of carrying relatively high currents, are required. In addition to such rectifier tubes, one or more series tubes are required to control the discharge of the condenser into the load circuit. Furthermore, in such systems it is usually desirable to provide a shunt circuit in order to permit the energy stored in the system including the welding transformer to decay. To control the flow of decay energy through the shunt circuit, at least one additional gaseous discharge tube of high current capacity is required. Other functions frequently desired include the control of the charge on the condenser in order to control the energy supplied to the load, and the provision of a demagnetizing circuit for the welding transformer. To effect these other functions additional control means are usually required. Accordingly, in order to effect the various functions required in the welding system and to afford the various controls incidental thereto many gaseous discharge devices or equivalent control means must be provided.

It is among the objects of the present invention to provide a condenser charging and discharging system in which the various functions, such as the supply of rectified charging current to the condenser at a predetermined voltage, the control of the discharge of this condenser through the welding or similar load, the shunting of the decay energy from the discharge circuit, and the provision of a demagnetizing current through one of the windings of the transformer, are effected by a pair of rectifying tubes, and a single relay device.

It is a further object of the invention to provide for the demagnetization of the core of the welding transformer by supplying a portion of the charging current of the condenser through the primary winding of the welding transformer in the reverse direction to the normal discharge of said condenser through the welding transformer.

It is a further object of the invention to utilize one of the half-wave rectifiers of the charging circuit of the condenser as a shunt tube to control the flow of decay energy through the welding transformer upon the discharge of the condenser.

The above and other objects and features of the invention will be made fully apparent to those skilled in the art from a consideration of the following detailed description taken in conjunction with the accompanying drawing which shows a circuit diagram of the system embodying my invention.

Referring to the drawing, reference numeral 5 indicates a resistance welding load adapted to be engaged by electrodes 6 and through which welding current is supplied from a secondary loop 7 of a welding transformer 8 having a primary winding 9. The primary winding 9 is adapted to be energized by the discharge of the comparatively large condenser 10 therethrough. The condenser 10 is adapted to be charged from a source of alternating current through a charging transformer 11 having a primary winding 12 the end terminals of which are connected across said source. The secondary winding 13 of the transformer 11 is provided with a tap 14 at one side of the center thereof, which tap is connected to the negative terminal of condenser 10. The other side of condenser 10 is connected to the upper end of the secondary winding 13 through the primary winding 9 of the welding transformer 8, a pair of contacts 15, and a controlled gaseous discharge device 17 having its anode 16 connected through a suitable resistor to the upper end of the secondary winding 13 and its cathode 18 connected through the contacts 15 to the upper end of the primary winding 9.

The tube 17 is also provided with a control grid 19 which is connected to the cathode 18 through a resistor 20. The grid 19 is also connected through a glow tube 21 to the adjustable arm 22 of a potentiometer 23, the resistor 24 of which is connected across the condenser 10 through the primary winding 9 of the transformer 8. The lower end of the secondary winding 13 of the charging transformer 11 is connected to the positive side of the condenser 10 through a pair of normally closed contacts 25 and a gaseous discharge device 26. The contacts 15 and 25 are controlled by a pair of armatures on a relay 27, which relay is biased in a closed direction by a spring 28. A solenoid 29 is adapted upon the energization thereof to actuate the relay 27 in a direction to open contacts 15 and 25 and simultaneously to close two pairs of back contacts 30 and 31. The closure of contacts 30 closes the discharge circuit for the condenser 10 through the primary winding of the welding transformer 8. The closure of the contacts 31 closes a shunt circuit across the condenser 10 through the discharge tube 26.

In the operation of the device described in the foregoing, assuming that the relay 27 is in its normal, that is to say deenergized, position, and also assuming that there is no charge upon the condenser 10, then upon one of the alternations of the source a current will be induced in the upper portion of the secondary winding 13 of the transformer 11 in such a direction that current flows from the upper end of the primary winding 13 through the gaseous discharge tube 17, the closed contacts 15, and the primary winding 9 of the welding transformer 8 to the positive side of the condenser 10 and thence through the condenser to the tap 14. On the next succeeding alternation, current flows from the lower end of the primary winding 13 through the normally closed contacts 25 and the gaseous discharge tube 26 to the positive side of the condenser 10 and thence to the tap 14. Thus, during the early portion of the charging period of the condenser 10 energy is supplied to said condenser through one or the other of the valves 17 or 26 during each alternation of the alternating current source. That portion of the charging current supplied through the tube 17 flows through the primary winding 9 in the opposite direction to that in which the condenser 10 is discharged and thus tends to demagnetize the core of the transformer 8. The portions of the charging current which are supplied from the two parts of the secondary winding 13 are unequal, the greater portion of the charging current being supplied through the control tube 17 and the lesser portion through the simple diode 26. This is due to the fact that the tap 14 is positioned to divide the winding 13 into two unequal portions, the upper portion being the larger. As the charge on the condenser 10 rises, the lower portion of the primary winding 13 becomes ineffective since it is incapable of supplying current against the back potential of the charge on the condenser 10 when this charge exceeds a given value. The upper portion of the secondary winding 13 continues to supply current through the tube 17 to charge the condenser 10 to a still higher potential. As long as the potential across the condenser 10 is below a predetermined value, the current flow through the resistor 24 of the potentiometer 23 is insufficient to cause a sufficiently large potential drop across the glow tube 21 to cause this tube to become conductive. When, however, the condenser 10 has been charged to the desired potential predetermined by the setting of adjustable arm 22 of potentiometer 23, sufficient current flows through the resistor 24 to cause a potential drop across the glow tube 21 large enough to effect conduction through this tube. The control grid 19 is thus, in effect, connected to a point the potential of which is considerably more negative than the potential at the end of the resistor 24 adjacent the cathode 18. The control 19 being thus negatively biased relative to the cathode 18, conduction through the tube is blocked upon the next succeeding alternation, and charging current to the condenser 10 is discontinued. The solenoid 29 of the relay 27 may now be energized to open the contacts 15 and 25 and close the contacts 30 and 31. It will be understood that the energization of the solenoid 29 may be effected in response to the closure of the electrodes 6 upon the work 5 or may be controlled manually as desired. Upon the closure of the contacts 30 and 31 the condenser 10 is discharged through the circuit including the primary winding 9 of the transformer 8 and the contacts 30 of the relay 27. Due to the inductance of the discharge circuit, including the transformer 8, the discharge of the condenser 10 tends to be oscillatory. Upon the appearance of the inverse charge across the condenser 10 potential is applied to the tube 26 in the direction in which this tube is conductive, and accordingly the energy stored in the welding system decays through the circuit including the contacts 31 and the diode 26.

From the foregoing it will be seen that the invention provides a construction in which but two gaseous discharge tubes of high current-carrying capacity need be provided in order to perform the many functions involved in the charging and discharging of the condenser 10 together with other incidental functions of the welding circuit. The two tubes 17 and 26 thus perform the functions of supplying rectified charging current to the condenser 10, of controlling the voltage to which the condenser is charged, of demagnetizing the transformer 8, and also shunting the decay energy of the transformer and associated load circuit.

Although there has been herein described a preferred embodiment of the invention other embodiments within the scope of the appended claims will be apparent to those skilled in the art from a consideration of the forms shown and the teachings hereof. Accordingly a broad interpretation of the appended claims commensurate with the scope of the invention within the art is desired.

What is claimed is:

1. A condenser charging and discharging system comprising a condenser, a source of alternating current, a charging circuit including a rectifier tube for charging said condenser from said source, a load circuit, a relay normally closing said charging circuit and adapted upon energiaztion to close said load circuit to discharge said condenser through said load circuit, and means effective upon the discharge of said condenser for connecting said tube across said condenser in the direction in which said tube is conductive upon the appearance of an inverse voltage across said condenser.

2. A condenser charging and discharging system comprising a condenser, a source of alternating current, a charging circuit including a rectifier tube for charging said condenser from said source, a load circuit including a transformer, a relay normally closing said charging circuit and adapted upon energization to open said charging circuit and close said load circuit to discharge said condenser through said transformer, and means effective simultaneously with the discharge of said condenser for connecting said tube across said condenser in the direction in which said tube is conductive upon the appearance of an inverse voltage across said condenser.

3. A condenser charging and discharging system comprising a condenser, a source of alternating current, means including a pair of gaseous discharge tubes connecting said source and said condenser for charging said condenser, a discharge circuit for said condenser including a transformer, means for connecting one of said gaseous discharge tubes to said condenser to supply charging current thereto through the primary winding of said transformer in a direction opposite to the direction of the discharge of said condenser therethrough, and means for connecting the other of said gaseous discharge tubes across said condenser upon the discharge thereof to provide a shunt circuit for the decay energy of said transformer and associated circuits.

4. A condenser charging and discharging system comprising a condenser, a source of alternating current, a load circuit including a transformer, means including a pair of rectifying tubes alternately charging said condenser from said source, the charging circuit through one of said tubes including the primary winding of said transformer, means for blocking said one of said tubes when the condenser is charged to a predetermined voltage, means to discharge said condenser through said transformer in a direction opposite to the flow of charging current therethrough, and means effective upon the discharge of said condenser for connecting the other of said tubes across said condenser in the direction in which said other tube is conductive upon the appearance of an inverse voltage across said condenser.

5. A condenser charging system comprising a condenser, a source of alternating current for charging said condenser, a charging transformer having a primary winding connected to said source and having a secondary winding divided into two unequal portions, a pair of gaseous discharge tubes each associated with one of said portions of said secondary winding to supply rectified current to said condenser in unequal increments upon successive alternations of said source, a control electrode for that one of said tubes associated with the larger portion of said secondary winding of said charging transformer, and means to supply a blocking potential to said electrode when the potential across said condenser reaches a predetermined value.

6. A condenser charging and discharging system comprising a condenser, a source of alternating current for charging said condenser, a charging transformer having a primary winding connected to said source and having a secondary winding divided into two portions, a pair of gaseous discharge tubes each associated with one of said parts of said secondary winding to supply rectified current to said condenser in unequal increments upon successive alternations of said source, a load transformer, a relay adapted when in one position to connect one portion of said secondary winding of said charging transformer to charge said condenser through one of said tubes and the primary winding of said load transformer, and to connect the other portion of said secondary winding of said charging transformer to charge said condenser directly through the other of said tubes, said relay adapted when in another position to connect said condenser to discharge through the primary winding of said load transformer in a direction opposite to the direction of the portion of the charging current therethrough.

7. A condenser charging and discharging system comprising a condenser, a source of alternating current for charging said condenser, a charging transformer having a primary winding connected to said source and having a secondary winding divided into two unequal portions, a pair of gaseous discharge tubes each associated with one of said parts of said secondary winding to supply rectified current to said condenser in unequal increments upon successive alternations of said source, a load transformer, and a relay adapted when in one position to connect the larger portion of said secondary winding of said charging transformer to charge said condenser through one of said tubes and the primary winding of said load transformer, and to connect the smaller portion of said secondary winding of said charging transformer to charge said condenser directly through the other of said tubes, said relay being adapted when in another position to connect said condenser to discharge through the primary winding of said load transformer in a direction opposite to the direction of the portion of the charging current therethrough.

8. A condenser charging and discharging system comprising a condenser, a source of alternating current for charging said condenser, a charging transformer having a primary winding connected to said source and having a secondary winding divided into two unequal portions, a pair of gaseous discharge tubes each associated with one of said parts of said secondary winding to supply rectified current to said condenser in unequal increments upon successive alternations of said source, a load transformer, and a relay adapted when in one position to connect the larger portion of said secondary winding of said charging transformer to charge said condenser through one of said tubes and the primary winding of said load transformer, and to connect the smaller portion of said secondary winding of said charging transformer to charge said condenser directly through the other of said tubes, said relay being adapted when in another position to connect said condenser to discharge through the primary winding of said load transformer in a direction opposite to the direction of the portion of the charging current supplied therethrough, and to connect said other of said tubes across said condenser in a direction to become conductive upon the appearance of an inverse voltage across said condenser thereby providing a shunt circuit for the decay energy of said load circuit.

9. A condenser charging and discharging system comprising a condenser, a source of alternating current for charging said condenser, a charging transformer having a primary winding connected to said source and having a secondary winding divided into two unequal portions, a pair of gaseous discharge tubes each associated with one of said parts of said secondary winding to supply rectified current to said condenser in unequal increments upon successive alternations of said source, a load transformer, a relay adapted when in one position to connect the larger portion of said secondary winding of said charging transformer to charge said condenser through one of said tubes and the primary winding of said load transformer, and to connect the smaller portion of said secondary winding of said charging transformer to charge said condenser directly through the other of said tubes, said relay adapted when in another position to connect said condenser to discharge through the primary winding of said load transformer in a direction opposite to the portion of the charging current therethrough, and to connect said other of said tubes across said condenser in a direction to become conductive upon the appearance of an inverse voltage across said condenser thereby providing a shunt circuit for the decay energy of said load circuit, a control electrode for said one of said tubes associated with the larger of said portion of said secondary winding and means to supply a blocking potential to said electrode when the potential across said condenser reaches a predetermined value.

10. A condenser charging and discharging system comprising a condenser, a source of alternating current, a rectifying tube including a pair of electrodes providing an anode-cathode circuit, means connecting said condenser to said source through said anode-cathode circuit for charging said condenser, a load circuit, means to discharge said condenser through said load circuit, and means effective upon the discharge of said condenser for connecting said anode-cathode circuit of said tube across said condenser in a direction to provide a shunt circuit for the decay energy from said load circuit.

11. A condenser charging and discharging system comprising a condenser, a source of alternating current, a rectifying tube including a pair of electrodes providing an anode-cathode circuit, means connecting said condenser to said source through said anode-cathode circuit for charging said condenser, a load circuit, means to discharge said condenser through said load circuit, and means effective upon the discharge of said condenser for disconnecting said rectifier tube from said source and connecting said anode-cathode circuit of said tube across said condenser in a direction to provide a shunt circuit for the decay energy from said load circuit.

HANS KLEMPERER.

REFERENCES CITED

The following references are of record in the file of this patent:

UNITED STATES PATENTS

| Number | Name | Date |
| --- | --- | --- |
| 2,319,763 | Humphrey | May 18, 1943 |
| 2,309,629 | Dawson | Feb. 2, 1943 |

FOREIGN PATENTS

| Number | Country | Date |
| --- | --- | --- |
| 548,618 | Great Britain | Oct. 16, 1942 |